(12) United States Patent
Paiement et al.

(10) Patent No.: US 11,546,435 B1
(45) Date of Patent: Jan. 3, 2023

(54) COGNITIVE PERSONA EMBEDDINGS FOR SECURE OMNI-CHANNEL PERSONALIZED RECOMMENDATIONS

(71) Applicant: AT&T Intellectual Property I, L.P., Atlanta, GA (US)

(72) Inventors: Jean-Francois Paiement, Palm Desert, CA (US); Eric Zavesky, Austin, TX (US); Mohammed Abdel-Wahab, New York, NY (US); Subhabrata Majumdar, Seattle, WA (US); Jianxiong Dong, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/520,106

(22) Filed: Nov. 5, 2021

(51) Int. Cl.
*G06F 15/16* (2006.01)
*H04L 67/306* (2022.01)
*G06F 16/9535* (2019.01)
*H04L 9/40* (2022.01)
*G06F 16/9035* (2019.01)

(52) U.S. Cl.
CPC ........ *H04L 67/306* (2013.01); *G06F 16/9035* (2019.01); *G06F 16/9535* (2019.01); *H04L 63/102* (2013.01)

(58) Field of Classification Search
None
See application file for complete search history.

(56) References Cited

U.S. PATENT DOCUMENTS

| | | |
|---|---|---|
| 2017/0200093 A1* | 7/2017 | Motahari Nezhad ........................ G06Q 10/1095 |
| 2018/0247241 A1* | 8/2018 | Avrahami ........ G06Q 10/06316 |
| 2019/0258818 A1* | 8/2019 | Yu ........................... G06F 21/31 |

* cited by examiner

Primary Examiner — Wing F Chan
Assistant Examiner — Andrew Woo
(74) Attorney, Agent, or Firm — Guntin & Gust, PLC; Andrew Gust

(57) ABSTRACT

A system for embedding users' preferences and behaviors based on interactions with an array of devices.

20 Claims, 6 Drawing Sheets

COGNITIVE PERSONA EMBEDDINGS FOR SECURE OMNI-CHANNEL PERSONALIZED RECOMMENDATIONS

BACKGROUND

A micro expression is a facial expression that only lasts for a short moment. It may be considered the innate result of a voluntary and an involuntary emotional response occurring simultaneously and conflicting with one another, and may occur when the amygdala (the emotion center of the brain) responds appropriately to the stimuli that the individual experiences. In some instances, the individual wishes to conceal this specific emotion. This may result in the individual very briefly displaying true emotions followed by a false emotional reaction.

Human emotions may be considered an unconscious biopsychosocial reaction that derives from the amygdala and typically last 0.5-4.0 seconds, although a micro expression will typically last less than 0.5 seconds. Unlike regular facial expressions it is very difficult to hide micro expression (e.g., unconscious) reactions. Micro expressions have a low probability of being controlled as they happen in a fraction of a second, but it is possible to capture someone's expressions with a high-speed camera and replay them at much slower speeds. Micro expressions commonly show the following emotions: disgust, anger, fear, sadness, happiness, contempt, and surprise, as well as a wide range of positive and negative emotions not all of which are encoded in facial muscles.

This background information is provided to reveal information believed by the applicant to be of possible relevance. No admission is necessarily intended, nor should be construed, that any of the preceding information constitutes prior art.

SUMMARY

A system is described for embedding users' preferences and behaviors based on their interactions with an array of devices. The disclosed subject may allow for use of observation/behavior for encoding, multiple scale models (e.g., building of a local/personal model and global ML models generalized by context), multiple evaluations that are influenced by fit to current context, or open understanding of decisions in which a user is allowed to query which embedding/behavior contributed to recommendation.

In an example, an apparatus may include a processor and a memory coupled with the processor that effectuates operations. The operations may include receiving observation information (e.g., behaviors such as micro expressions) associated with a first user profile (e.g., electronic profile for user) for a first user device; representing as encodings the observation information associated with the first user profile; determining, based on the encodings, a local model for the first user profile for the first user device; and granting access to or distributing the local model to a plurality of services or devices that may be used by the first user profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

There is an increasing need to share information and preferences for a user across all devices/verticals that may exist within or across enterprises. Personalization to go will be a way for users to privately carry their own recommendations and preferences on devices with which they interact in the world. This personalization can be on a device or securely synced in the cloud to convey users' local fingerprint/embedding with long-term memory and instantaneous (pre-cognitive) interactions. With access to precognitive measurements of the user, the need will arise to securely update those preferences. That update can occur on mobile devices (including cars), in the home (for a family) or in a cloud environment. Updates must be securely transmitted via partial differential privacy such that a single user's embedding (e.g., encoding) cannot be precisely reconstructed if those updates are captured. Additionally, to provide an "omni-channel" personalization for best user satisfaction, the personalization should improve customer satisfaction and service for both vertical products (different phones, devices or games within a same use class) and horizontal products (different services like entertainment, personal chat, etc.). Additionally, these "omni-channel" updates can also handle larger groups of people (e.g., a family), which binds to the privacy settings and updates of the encodings.

Figure 1:
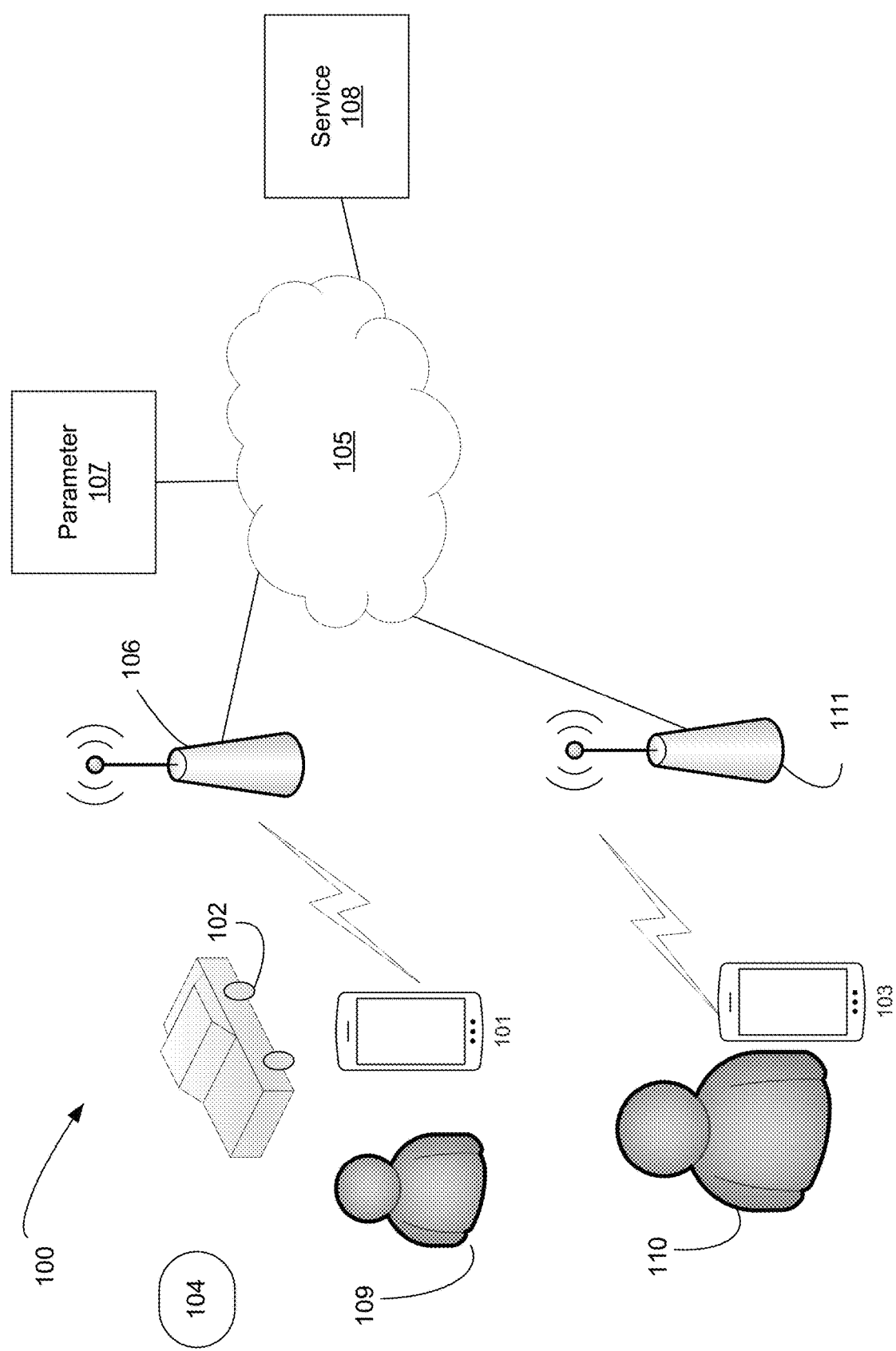
FIG. 1 illustrates an exemplary system that may use cognitive persona embeddings for secure omni-channel personalized recommendations or other actions.

FIG. 1 illustrates an exemplary system that may use cognitive persona embeddings for secure omni-channel personalized recommendations or other actions. System 100 may include network 105. Device 101 (e.g., a mobile phone), smart car 102, device 103, sensor 104, base station 106, base station 111, parameter server 107, service server 108, or the like may be communicatively connected with each other via network 105. Network 105 may include vRouters, access points, DNS servers, firewalls, or the like virtual or physical entities. It is contemplated that the functions disclosed herein may be distributed over multiple physical or virtual entities or located within a single physical or virtual entity. In an example, the functions of parameter sever 107 and service server 108 may be functions located within service server 108 alone. Sensor 104 may be able to communicate to network 105 through a wired or wireless connection.

Sensor information may be captured by sensor 104, smart car 102, device 101, device 103, or other devices in proximity to a person (e.g., user 109 or user 110). In this example, device 101 and smart car 102 may be particularly associated with user 109 based on a user profile. The sensor information may include bio related information (e.g., bio imprints), such as heartbeat waves pattern, salinity, pulse, chemical composition of body (e.g., composition of adjacent fluid or tissue), person's voice pattern, person's gait, orientation of sensor 104 (e.g., accelerometer or gyroscope information), audio captured, video captured, or sensed temperature, among other things. The information may include location information (e.g., location imprints). The location information may be determined by the consideration of one or more of the following: global positioning system information, wireless signal strength near sensor 104, wireless signal presence near sensor 104 (e.g., proximate to another sensor, which may be implanted or connected with the same or different person), accelerometer information, or gyroscope information, among other things. The information may be recorded over time (e.g., by sensor 104, smart car 102, or device 101).

In an example scenario, sensor 101 may record video within a time period and send the video to server 108. Server 108 may process the video in a manner to analyze unconscious behaviors (e.g., micro expressions) of one or more objects (e.g., persons or pets) within the video. In this example, the micro expressions may be facial expressions. Micro expressions are usually considered facial expressions that occur within a fraction of a second. This involuntary emotional leakage may expose a person's true emotions. It is contemplated that the movement of other parts of the body may be considered with regard to micro expressions. The stimulus may be provided by parameter server 107. In this example, the content may be an originally released movie or other content that may have additional stimulus added (e.g., text, video, or audio) by a service provider that was not in the original movie. More generally, stimulus may include audio (e.g., audio alert from mobile device, audio alert from TV, audio alert from smart speaker, audio alert from doorbell system, etc.), video (e.g., text/video alert from mobile device, text/video alert from TV, etc.), or other stimuli (e.g., changes of color or brightness of a display, changed brightness of room lighting, etc.). In another embodiment, the parameter server 107 may identify and track the co-occurrence of an these general, externally created stimuli either through ancillary sensors 101 or 103 or through direct messaging of the begin and end of activities controlled by one or more devices 102, 101, 103. For example, an autonomous car 102 may execute a dis-preferred navigation choice by the user 109, or content selected for playback on device 103 may be identified as a trending favorite for user 110.

Figure 2:
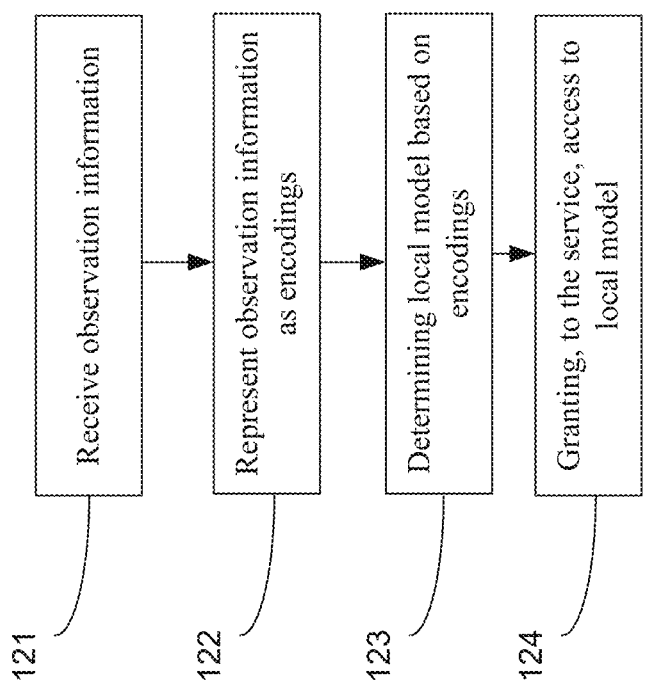
FIG. 2 illustrates an exemplary method for cognitive persona embeddings for secure omni-channel personalized recommendations or other actions.

FIG. 2 illustrates an exemplary method for cognitive persona embeddings for secure omni-channel personalized recommendations or other actions. At step 121, receive, by parameter server 107, observation information associated with a first user profile (e.g., user 109) for a first user device (e.g., device 101). The observation information may include the sensor information or the like as provided herein. At step 122, creating encodings based on the observation information associated with the first user profile. The encoding may be relatively basic electronic representations that indicate the interactions of user 109. Feedback may be transformed into a vectorized update. In an example, the encodings may be an alphanumeric representation that indicates the stimulus and the response by user 109 via device 101 (or smart car 102, device 104, etc.). In another example, after information is received, a change may be integrated into the expected distribution of user actions. In one embodiment, that update can utilize reinforcement learning (RL) to automatically tune the distribution with a higher precision. Reinforcement learning is a machine learning (ML) technique that produces a prediction but then observes the effects of that prediction on its environment to receive a reward (a positive reward for correct behavior or a negative reward for incorrect behavior). The use of RL (as opposed to other ML techniques) allows for self-managed updates (e.g., personalization, recalibration, gradual distribution changes) that may otherwise require more manual intervention to update the encoding models and representations from an action at hand (e.g., tensor). Supervised and unsupervised machine learning methods (e.g., neural networks) could also be used instead of or in addition to the aforementioned RL method in order to generate the vectorized updates.

At step 123, determining, based on the encodings, a local model for the first user profile for device 101. This local model in this instant is meant to be constrained to the interactions of user 109 and device 101. It is contemplated that it may be constrained by the location (e.g., geographic boundary) of user 109. At step 124, granting access to (e.g., remote access) or distributing (e.g., sending to remote servers) the local model to a plurality of services that may be used by device 101. The types of service may include a gaming service, an electronic mail service, a weather service, or a public safety service, among others. It is contemplated that parameter server 107 may receive encodings associated with a plurality of different user profiles and use the encodings associated with the plurality of different user profiles to create a global model for many users in a similar context (e.g., similar device, similar environmental information, etc.). The global model may be distributed or accessed in a similar manner to the local model.

With continued reference to the scenario associated with FIG. 2, there may be a refined aggregate model created. For example, based on the local model and global model(s) creating a refined aggregate model for the first user profile. The refined aggregate model may be for devices that user 109 has not interacted with before and may be considered a personalized default model for user 109.

Figure 3:
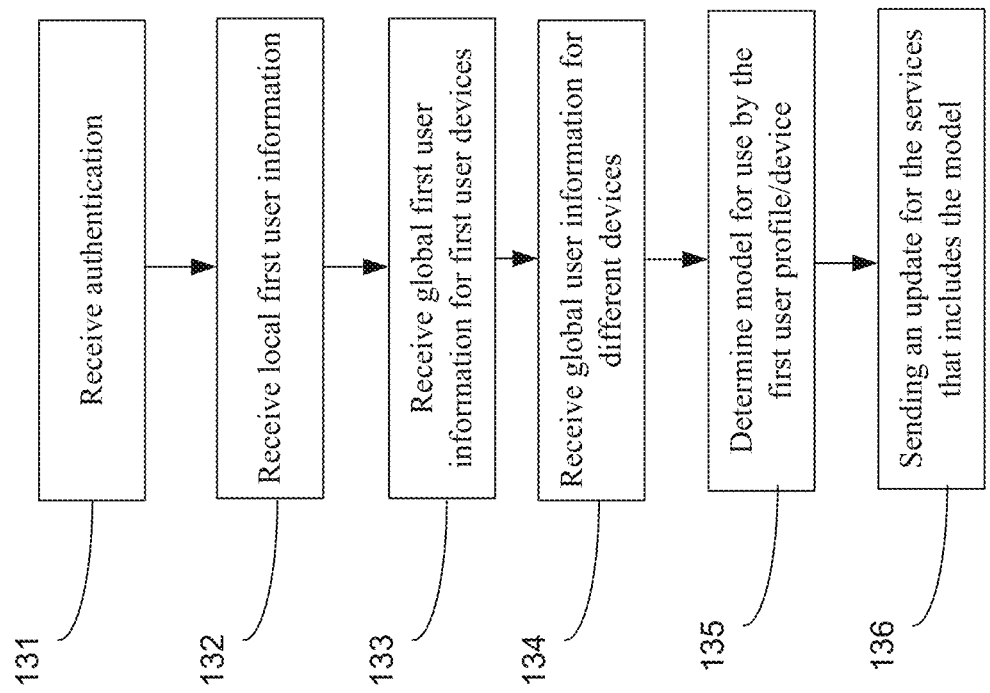
FIG. 3 illustrates an exemplary method for cognitive persona embeddings for secure omni-channel personalized recommendations or other actions.

FIG. 3 illustrates an exemplary method for cognitive persona embeddings for secure omni-channel personalized recommendations or other actions. At step 131, an indication of an authentication may be received that associates user 109 with device 101. This authentication may be or may not include explicit checking of an encoding 122 before proceeding (e.g., an auto-authentication may occur as part of a long-running interactive user session instead of an explicit task start and authentication requirement). At step 132, the indication of user 109 in step 131 may trigger obtaining local user 109 information associated with device 101 linked to user 109 or at step 133, global user 109 information associated with a plurality of devices linked to user 109. The global user 109 information is for different types of devices used by the user 109. At step 134, global information associated with a plurality of different devices linked to a plurality of different users is received. At step 135, determining a model associated with the user profile based on the global user 109 information associated with the plurality of devices linked to the first user profile, local user 109 information associated with device linked to the first user profile, or the global information associated a plurality of different devices linked to the plurality of different users. It is contemplated that global user 109 information, local user 109 information, or global information may be encoded and used to create one or more models. The global information may be for different groups (e.g., family, co-workers, role-based derivations in a specific profession, a specific device type used by multiple users, specific services used by multiple users at a location, services used by multiple users during a period, or the like). The global information is meant to simultaneously offer a back-up encoding model (e.g., if a user or device hasn't been seen before) and to smooth the differences (e.g., create more natural probability distributions of actions and encodings) across users and devices with more observations. A secondary use for global information is as a back-up for network constrained environments, where one or more model created by the service 108 can not be quickly or sufficiently distributed through the network 105 to the different user devices, 101, 102, or 103.

With continued reference to FIG. 3, at step 136, sending an update message to a service server. The service server may be a server whose primary function is to help operate a particular service or services. The service server may be physical or virtual. The update message of step 126 may include the model of step 135 or encoding of step 135.

The service server may operate a service for device 101 based on the encoding using the model. The plurality of different devices may be indicative of different types of devices, such as a mobile phone, a smart vehicle (e.g., autonomous or connected car), laptop computer, desktop computer, XR headset, smart watch, smart speaker, or tablet computer, among other devices.

The disclosed system may allow and respond to requests to explain the reasons for the type of personalization of a service. For example, providing that an option was turned on/off based on particular local user 109 response to stimuli or global response to stimuli. In addition, there may be temporal updates of the model based on learning over a period. These learnings may be driven by explicit local or global model updates or via an automated reinforcement learning (RL) process previously described. The learning may be based on new or similar stimuli. Further, there may be testing of the model that uses the encodings for a bias issue or a privacy issue. When the bias issue or privacy issue is discovered via testing, there may be an update of the encoding or the model to remove the bias issue or the privacy issue. The model may be tested locally (e.g., device 101 for user 109) or on a more global level (e.g., parameter server 107 or service server 108 for many users). Further, the bias or privacy issue may be detected and dispatched (or buffered) for an encoding update at a later time, which may involve local or global level models and/or the inclusion of varying device specifications. In both situations, the bias or privacy issue will be analyzed with the intention to simultaneously solve it for both the current user and other users that would receive the model updates. It is contemplated herein that the subject matter, such as in FIG. 2 or FIG. 3, may have steps that occur solely on one device or distributed over different devices.

The disclosed systems, methods, and apparatuses may use information regarding unconscious behaviors or conscious behaviors for recommendations, authentication, or other actions. As provided herein, the information obtained may be a mix of high frequency, precognitive signals (e.g., brain or micro-expression reaction), subsequent user actions (spoken sentiment, large facial expression, logging out of app, specific gestures, interactions with device's user interfaces), and other information, such as time of day, weather, or location, among other things. The obtained information may be used for authentication services (e.g., for static identity and activities) that uses conscious or unconscious reactions. Discovery of unconscious preferences may be a significant part of identification of a user and may also be utilized with recommendation services. The obtained information may be used for services that analyze or predict a demographic or personal attribute given stimulus (e.g., video content) and the user's reaction (e.g., via neurological-based behavior). Some preferences by a user are unconscious and difficult for them to discover, so the disclosed system may allow for discovery of this unconscious information and use in seemingly unusual situations, such as dating profiles (e.g., there may be generated an unconscious preference score for each profile) or job applications for various professions.

The disclosed system may automatically differentiate recommendations (which may include advertising or alerts) by different context (e.g., work, with friends, at home), behavioral observation (conscious or unconscious), or magnitude of behavioral observation (e.g., passionate, ambivalent, etc.) that may be specifically trained for each user. In an example, the disclosed system may determine who is viewing and using a device. The system may allow for disambiguation between who is watching and who "has the remote" as "primary viewer" by unconscious behavioral differences. In addition, the system may include bias detection (e.g., the user's demeanor generally alone or with other users). The obtained sensor information may be processed in a different way (e.g., aggregated on a different level) and may cause for a modified analysis (e.g., although it appears user 110 enjoyed a movie with multiple people, yet tests place user 110 as generally optimistic, so the system normalizes the behavioral classification to only mild satisfaction for user 110).

The disclosed system may automatically authenticate a user identity based on behavior during tasks (e.g., continuous tasks) to validate long-term identity for a service. In an example situation regarding account sharing, based on unconscious information (e.g., high pulse) and conscious information (e.g., password), there may be a determination that a user with a high pulse is just excited versus up to something nefarious (e.g., account fraud).

Deeper understanding of user preferences where systems or the user may be unable to adequately express their need, interest, or its magnitude provides a foundation for a rich recommendation system without explicit expression by user (or complementing it). With passive preference determination, a provider can send real-time feedback to content creators and advertisers to improve or otherwise adjust products for a specific user and identity/demographic. Also, the system allows for detection of "tune away" or loss of interest as well as what was a likely distractor for interest (dislike, distraction, etc.). The system allows for combination of multiple methods for authentication (beyond two-factor authentication) that have a rich, hard to emulate process. The system may attempt to evoke specific behavior or reaction from user to provide that expectation as feature input to system (e.g., in the case of fraud detection or normalization estimate).

Additional use cases for the disclosed systems include therapy situations. For example, usage in education and therapy situations (e.g., Cognitive Behavioral Therapy) where the system couples short- and long-term responses with the user's desire to change a response (e.g., afraid of clowns, but gradual exposure strategically embedded in video (e.g., movie or TV) or other stimulus to clown-like items may lead to a reduction in perceived and actual fear).

The disclosed subject matter provides for embedding users' preferences and behaviors based on their interactions with an array of devices, such as within or across enterprises. Utility goals for the system may be precognitive feedback or implicit discovery. An example of precognitive feedback mechanism for persona context encoding is the following: computationally updating two personalization embeddings, such as device/vertical (e.g., device across an enterprise) and action/context (e.g., a user's actions in a context with a specific device). An example of implicit discovery of tuning/personalization parameters may be a combination of person-based, device class, and service offered, or the like. To achieve these goals, based on available—and potentially heterogeneous—data, a common high-dimensional embedding is calculated for each user. This embedding aims to encode and predict user behavior patterns, and may be updated or enhanced with time based on factors including but not limited to modified data sources, shift in user/user group behavior pattern, or prioritized business metrics. In current state of the art systems, recommendation and personalization must be retrained with every task and model through an enterprise. In current systems, adaptation and personalization are explicit (people have to say/correct themselves) and static system personalization from large bodies of individuals may be too rigid or generic (need a probability of outputs) for strong recommendations or authentication (can you detect when a departure from this embedding has occurred). In comparison, the disclosed subject matter allows integration of common user features across devices. This enables more integrated personalization opportunities by learning to utilize common usage patterns across devices or user segments. As and when required, input and output communication channels can be augmented with security/privacy protocols to ensure the feasibility of this inter-context knowledge transfer process in light of regulatory/ethical/privacy guidelines. See FIG. 4.

Figure 4:
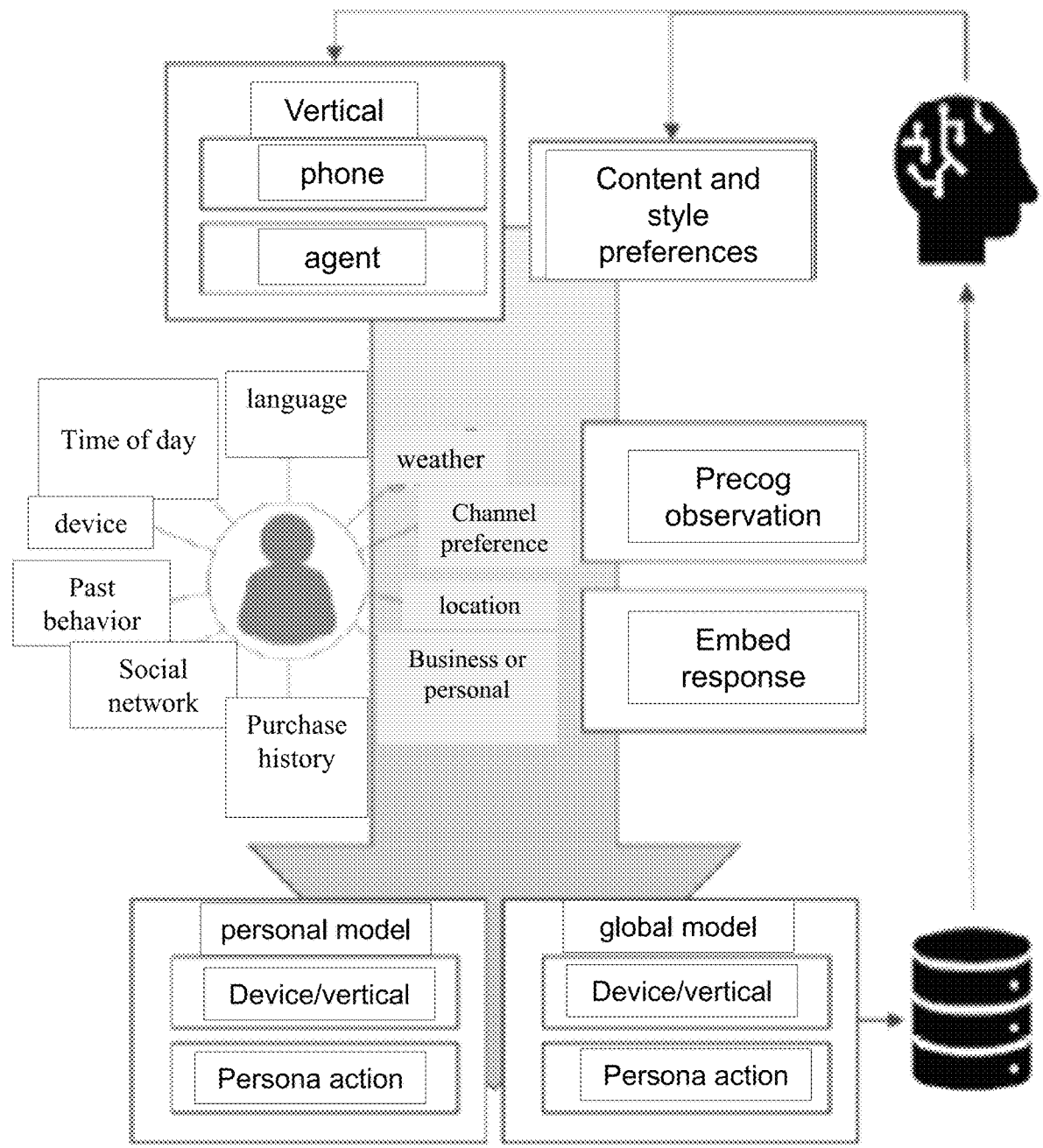
FIG. 4 illustrates an exemplary system for cognitive persona embeddings for secure omni-channel personalized recommendations or other actions.

With continued reference to FIG. 4, there may be personalized tuning for device 101, which may be associated with verticals. Interactions may build skillsets, such as user 109 information regarding driving speed of a car and biking speed on a stationary bike may translate to operation of an autonomous vehicle. Behaviors may be encoded (e.g., how user 109 likes pasta/steak) based on types of restaurants user 109 eats at, which may then be conveyed to appliance settings (e.g., oven settings). There may be privacy preservation while passing around models (e.g., tuning) which may be based on shared delta from a specific device (e.g., similar to a security token).

It is contemplated that the models or encodings may be for physical users or artificial intelligence-based personas (e.g., driving agents in a race car versus truck versus a consumer bus), which may benefit from tow embedding sources (verticals and context/persona). There may be application of part of embedding for non-related persona similarity evaluations, such as find similar users or find similar verticals by nearest match or find partners that can ride back with user 109, instead of using them for personalization. There may be determination of different preferences, such as swipe direction of user 109, preferred embedding learned (e.g., phone preferred over laptop or smart vehicle), or using precognitive observations versus expectation (e.g., user 109's precognitive negative feedback versus an expected satisfaction) which can be quickly AB tested to find if user personas or broader classes prefer this.

Using the disclosed subject matter there may be possibility for larger standard establishment (between devices and user profiles) in which personalization preferences are locally managed by the user and only shared when proximally solicited (instead of cookies and remote management or whole ownership). Recalibration or personalization can be continuous or restarted. Optionally, a marketplace for shared profiles can be created and used, which may improve embedding specificity with additional data describing user/vertical or the personal actions. Differentially private noise injection can be integrated whenever data is shared between components (e.g., to/from user devices, cloud, across enterprise, etc.) in order to appropriately guarantee user privacy based on user agreement within and across enterprises.

Figure 5:
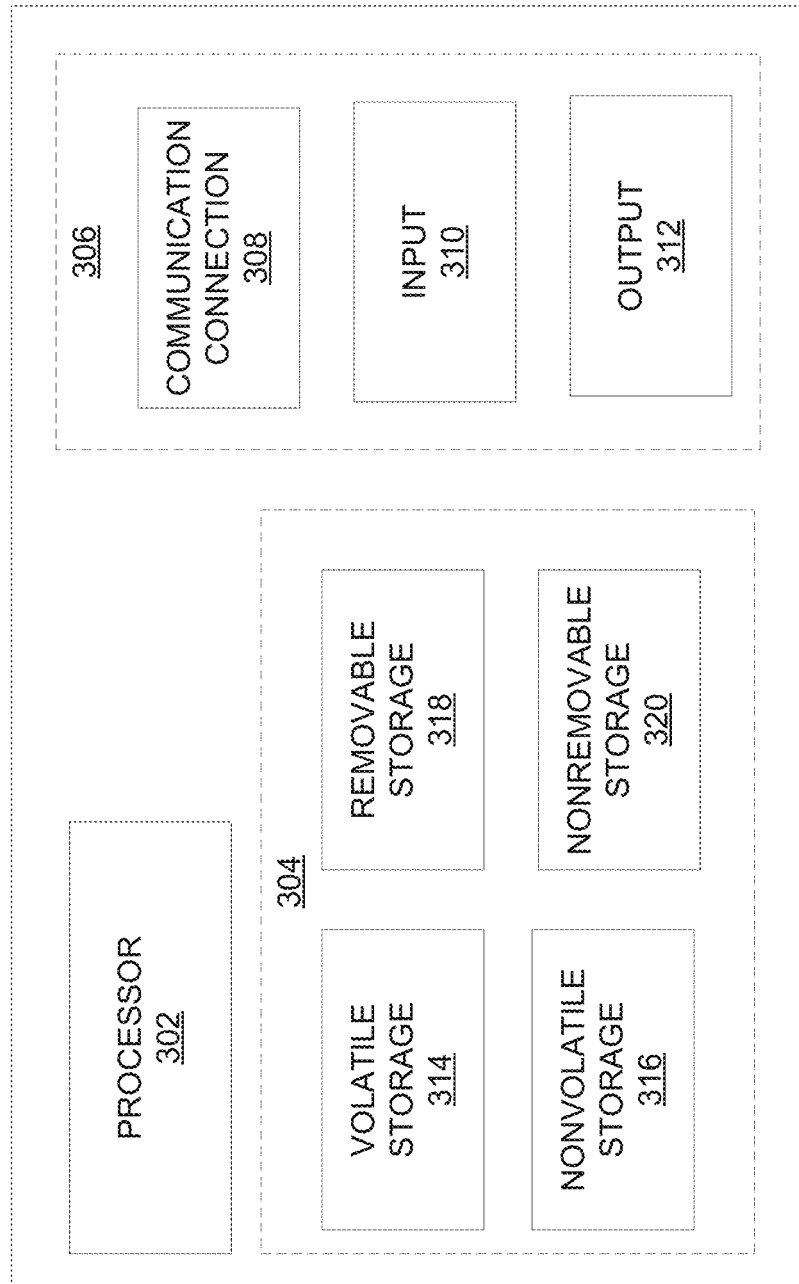
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
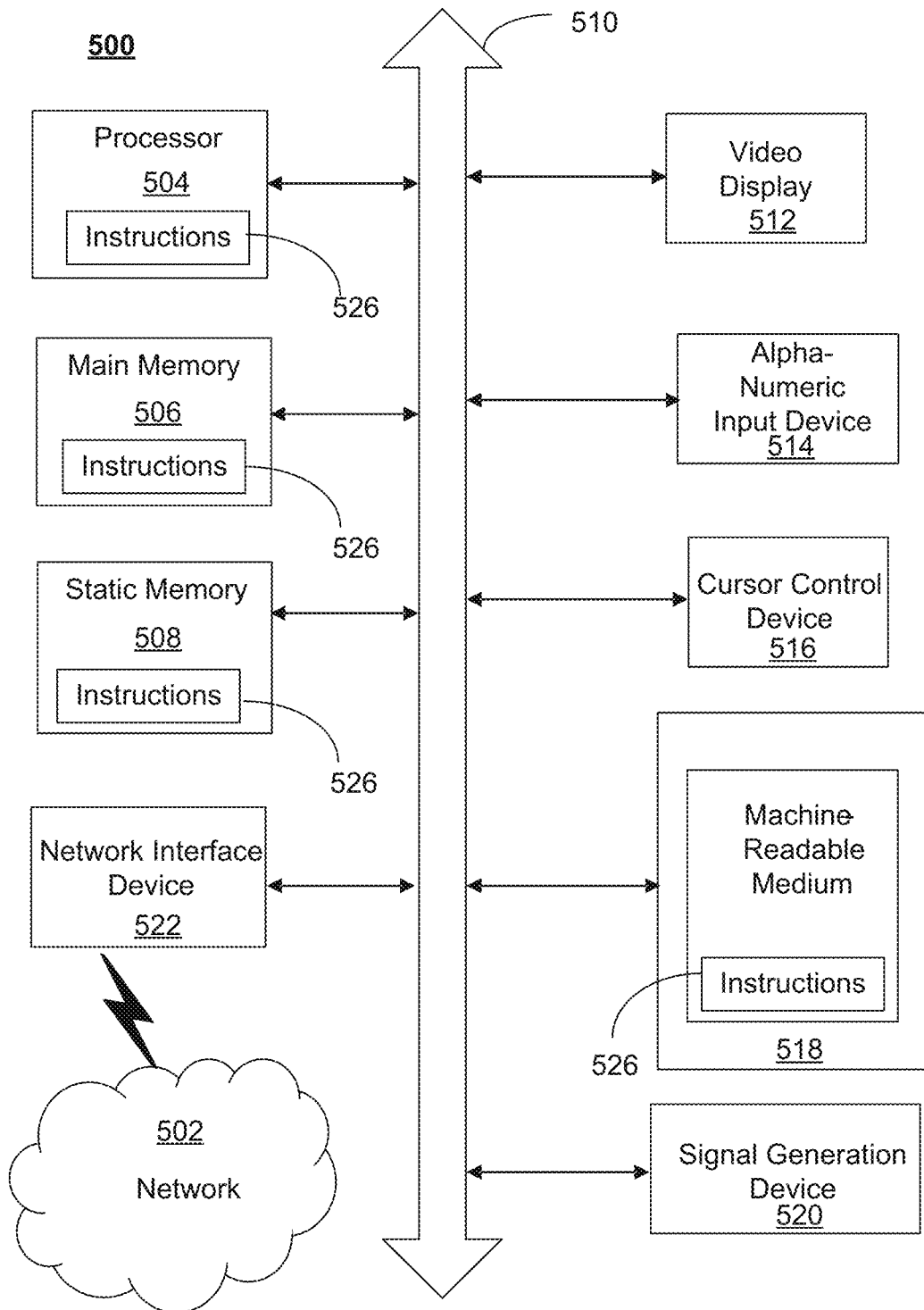
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, device 101, smart car 102, device 103, base station 106, parameter server 107, base station 11, service server 108, sensor 104, and other devices of FIG. 1 and FIG. 4. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which cognitive persona embeddings alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—cognitive persona embeddings—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for means for managing or operating a subscriber storage domain. A method, system, computer readable storage medium, or apparatus may provide for receiving observation information associated with a first user profile (e.g., electronic profile for user 109) for a first user device; representing as encodings the observation information associated with the first user profile; determining, based on the encodings, a local model for the first user profile for the first user device; and granting access to or distributing the local model to a plurality of services that may be used by the first user profile. The service may include a gaming service, an electronic mail service, a weather service, or a public safety service, among others. The method, system, computer readable storage medium, or apparatus may provide for receiving encodings associated with a plurality of different user profiles; and using the encodings associated with the plurality of different user profiles to create a global model for many users in similar context. All combinations in this paragraph and the below paragraph (including the removal or addition of steps) are contemplated in a manner that is consistent with the other portions of the detailed description A method, system, computer readable storage medium, or apparatus provides for receiving an indication of an authentication that associates a first user profile with a device; receiving local user information associated with device 101 linked to the first user profile; receiving global user information associated with a plurality of devices linked to the first user profile; receiving global user information associated a plurality of different devices linked to a plurality of different users; determining a model associated with the user profile based on the global user information associated with the plurality of devices linked to the first user profile, local user information associated with device linked to the first user profile, or the global user information associated a plurality of different devices linked to the plurality of different users; and sending an update message to a service server, wherein the update message comprises the embedding associated with the user profile. The apparatus may be a parameter server. The parameter server may observe differences automatically from user behavior or encoding. The plurality of services may include personalization services for content recommendations, navigation preferences, social network discovery, or device/UX customizations may be relevant here. All combinations in this paragraph (including the removal or addition of steps) are contemplated in a manner that is consistent with the other portions of the detailed description.

What is claimed:

1. An apparatus comprising:
    a processor; and
    memory coupled with the processor, the memory storing executable instructions that when executed by the processor cause the processor to effectuate operations comprising:
        receiving behavior information associated with a first user profile for a first user device;
        representing as encodings the behavior information associated with the first user profile;
        determining, based on the encodings, a local model for the first user profile for the first user device; and
        granting access to or distributing the local model to a plurality of services that is used by the first user profile.

2. The apparatus of claim 1, the operations further comprising:
    receiving encodings associated with a plurality of different user profiles; and
    using the encodings associated with the plurality of different user profiles to create a global model for users in a similar context.

3. The apparatus of claim 1, the operations further comprising distributing or providing access to the local model or a global model.

4. The apparatus of claim 1, the operations further comprising based on the local model and a global model creating a refined aggregate model for the first user profile.

5. The apparatus of claim 1, wherein the apparatus is a parameter server, wherein the parameter server observes differences automatically from user behavior or encoding.

6. The apparatus of claim 1, wherein the plurality of services comprises a gaming service or an electronic mail service.

7. The apparatus of claim 1, wherein the plurality of services comprises personalization services for content recommendations, navigation preferences, social network discovery, or device/UX customizations.

8. A computer readable storage medium storing computer executable instructions that when executed by a computing device cause said computing device to effectuate operations comprising:
   receiving behavior information associated with a first user profile for a first user device;
   representing as encodings the behavior information associated with the first user profile;
   determining, based on the encodings, a local model for the first user profile for the first user device; and
   granting access to or distributing the local model to a plurality of services that is used by the first user profile.

9. The computer readable storage medium of claim 8, the operations further comprising:
   receiving encodings associated with a plurality of different user profiles; and
   using the encodings associated with the plurality of different user profiles to create a global model for users in a similar context.

10. The computer readable storage medium of claim 8, the operations further comprising distributing or providing access to the local model or a global model.

11. The computer readable storage medium of claim 8, the operations further comprising based on the local model and a global model creating a refined aggregate model for the first user profile.

12. The computer readable storage medium of claim 8, wherein the plurality of services comprises a gaming service.

13. The computer readable storage medium of claim 8, wherein the plurality of services comprises an electronic mail service.

14. The computer readable storage medium of claim 8, wherein the plurality of services comprises personalization services for content recommendations, navigation preferences, social network discovery, or device/UX customizations.

15. A method comprising:
   receiving behavior information associated with a first user profile for a first user device;
   representing as encodings the behavior information associated with the first user profile;
   determining, based on the encodings, a local model for the first user profile for the first user device; and
   granting access to or distributing the local model to a plurality of services that is used by the first user profile.

16. The method of claim 15, the operations further comprising:
   receiving encodings associated with a plurality of different user profiles; and
   using the encodings associated with the plurality of different user profiles to create a global model for users in a similar context.

17. The method of claim 15, the operations further comprising distributing or providing access to the local model or a global model.

18. The method of claim 15, the operations further comprising based on the local model and a global model creating a refined aggregate model for the first user profile.

19. The method of claim 15, wherein the plurality of services comprises personalization services for content recommendations.

20. The method of claim 15, wherein the plurality of services comprises navigation preferences.

* * * * *